United States Patent
Ling et al.

(10) Patent No.: US 9,985,720 B2
(45) Date of Patent: May 29, 2018

(54) METHOD AND SYSTEM FOR AN INTERNET PROTOCOL LNB SUPPORTING SENSORS

(71) Applicants: Curtis Ling, Carlsbad, CA (US); Timothy Gallagher, Encinitas, CA (US); Glenn Chang, Carlsbad, CA (US)

(72) Inventors: Curtis Ling, Carlsbad, CA (US); Timothy Gallagher, Encinitas, CA (US); Glenn Chang, Carlsbad, CA (US)

(73) Assignee: MAXLINEAR, INC., Carlsbad, CA (US)

(*) Notice: Subject to any disclaimer, the term of this patent is extended or adjusted under 35 U.S.C. 154(b) by 760 days.

(21) Appl. No.: 13/687,626

(22) Filed: Nov. 28, 2012

(65) Prior Publication Data
US 2013/0203337 A1    Aug. 8, 2013

Related U.S. Application Data

(60) Provisional application No. 61/595,654, filed on Feb. 6, 2012.

(51) Int. Cl.
*H04H 20/74* (2008.01)
*H04B 7/185* (2006.01)
(Continued)

(52) U.S. Cl.
CPC .......... *H04B 7/18526* (2013.01); *G01S 19/42* (2013.01); *H04B 7/185* (2013.01);
(Continued)

(58) Field of Classification Search
CPC ...................................................... H04H 20/74
See application file for complete search history.

(56) References Cited

U.S. PATENT DOCUMENTS

2004/0227655 A1* 11/2004 King .................... H01Q 1/1257
                                                    341/176
2009/0003352 A1*  1/2009 Gutknecht et al. ...... 370/395.32
(Continued)

OTHER PUBLICATIONS

International Search Report and the Written Opinion of the International Searching Authority, in Application No. PCT/US13/24971, dated Jun. 10, 2013. (11 pages).

*Primary Examiner* — Ankur Jain
(74) *Attorney, Agent, or Firm* — McAndrews, Held & Malloy, Ltd.

(57) ABSTRACT

An Internet protocol low noise block downconverter (IP LNB) assembly, which is within a satellite dish assembly, may be operable to collect information received from one or more sensors that are integrated within or coupled to the IP LNB assembly. The IP LNB assembly may provide data and/or services associated with the satellite dish assembly based on the collected information received from the sensor(s). The collected information may be stored locally or remotely. The sensor(s) may comprise a camera, an atmospheric sensor, a motion sensor, a directional sensor, an insolation sensor, an acoustic sensor and/or a seismic sensor. The IP LNB assembly may communicate, to at least a user, one or more alarms based on temporal or spatial changes in the collected information. The sensor(s) may perform infrared (IR), cosmic radiation, ultraviolet (UV), far infrared (FIR), terahertz (THz) radiation, millimeter wave (MMW) and/or microwave sensing.

38 Claims, 6 Drawing Sheets

(51) Int. Cl.

| | | |
|---|---|---|
| *H04W 84/10* | (2009.01) | |
| *H04H 40/90* | (2008.01) | |
| *H04N 21/45* | (2011.01) | |
| *H04N 21/61* | (2011.01) | |
| *H04H 20/08* | (2008.01) | |
| *H04N 21/643* | (2011.01) | |
| *H04W 4/02* | (2018.01) | |
| *H04N 21/41* | (2011.01) | |
| *H04N 21/4363* | (2011.01) | |
| *H04N 21/4405* | (2011.01) | |
| *H04N 21/434* | (2011.01) | |
| *H04N 21/438* | (2011.01) | |
| *H04N 21/4408* | (2011.01) | |
| *H04N 21/441* | (2011.01) | |
| *H04N 21/4627* | (2011.01) | |
| *H04J 4/00* | (2006.01) | |
| *H04W 76/04* | (2009.01) | |
| *H04L 12/741* | (2013.01) | |
| *H04L 29/12* | (2006.01) | |
| *H04W 84/04* | (2009.01) | |
| *H04W 88/08* | (2009.01) | |
| *H04W 88/16* | (2009.01) | |
| *G01S 19/42* | (2010.01) | |
| *H04L 29/06* | (2006.01) | |
| *H04H 60/21* | (2008.01) | |
| *H04H 60/23* | (2008.01) | |
| *H04W 84/12* | (2009.01) | |

(52) U.S. Cl.
CPC ..... *H04B 7/18515* (2013.01); *H04B 7/18517* (2013.01); *H04B 7/18523* (2013.01); *H04H 20/08* (2013.01); *H04H 40/90* (2013.01); *H04J 4/00* (2013.01); *H04L 45/74* (2013.01); *H04L 61/2007* (2013.01); *H04L 65/4076* (2013.01); *H04N 21/4126* (2013.01); *H04N 21/4343* (2013.01); *H04N 21/4382* (2013.01); *H04N 21/43637* (2013.01); *H04N 21/441* (2013.01); *H04N 21/4405* (2013.01); *H04N 21/4408* (2013.01); *H04N 21/4524* (2013.01); *H04N 21/4627* (2013.01); *H04N 21/61* (2013.01); *H04N 21/6143* (2013.01); *H04N 21/6193* (2013.01); *H04N 21/64322* (2013.01); *H04W 4/023* (2013.01); *H04W 76/04* (2013.01); *H04W 84/042* (2013.01); *H04W 84/10* (2013.01); *H04W 88/08* (2013.01); *H04W 88/16* (2013.01); *H04H 60/21* (2013.01); *H04H 60/23* (2013.01); *H04W 84/12* (2013.01)

(56) References Cited

U.S. PATENT DOCUMENTS

| | | |
|---|---|---|
| 2009/0303100 A1 | 12/2009 | Zemany |
| 2011/0019785 A1 | 1/2011 | Cowley et al. |
| 2011/0273344 A1* | 11/2011 | Reams .......................... 343/704 |
| 2012/0297426 A1 | 11/2012 | Ling et al. |

* cited by examiner

METHOD AND SYSTEM FOR AN INTERNET PROTOCOL LNB SUPPORTING SENSORS

CROSS-REFERENCE TO RELATED APPLICATIONS/INCORPORATION BY REFERENCE

This patent application makes reference to, claims priority to, and claims benefit from U.S. Provisional Application Ser. No. 61/595,654, which was filed on Feb. 6, 2012.

This application also makes reference to:
U.S. patent application Ser. No. 13/326,125 filed on Dec. 14, 2011;
U.S. patent application Ser. No. 13/596,852 filed on Aug. 28, 2012;
U.S. patent application Ser. No. 13/715,250 filed on Dec. 14, 2012;
U.S. patent application Ser. No. 13/687,676 filed on Nov. 28, 21012; and
U.S. patent application Ser. No. 13/687,742 filed on Nov. 28, 2012.

Each of the above stated applications is hereby incorporated herein by reference in its entirety.

FIELD OF THE INVENTION

Certain embodiments of the invention relate to communication systems. More specifically, certain embodiments of the invention relate to a method and system for an Internet protocol LNB supporting sensors.

BACKGROUND OF THE INVENTION

A satellite television system may comprise a low noise block downconverter (LNB) which is generally co-located with a satellite dish in the satellite television system. The conventional LNB may be operable to amplify a received radio frequency (RF) satellite signal and convert such signal to lower frequencies such as, for example, intermediate frequencies (IF). Presently, satellite television systems have become ubiquitous, primarily due to reductions in the cost of satellite television reception technology. A plurality of satellite television systems may be in a neighborhood.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for an Internet protocol LNB supporting sensors, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
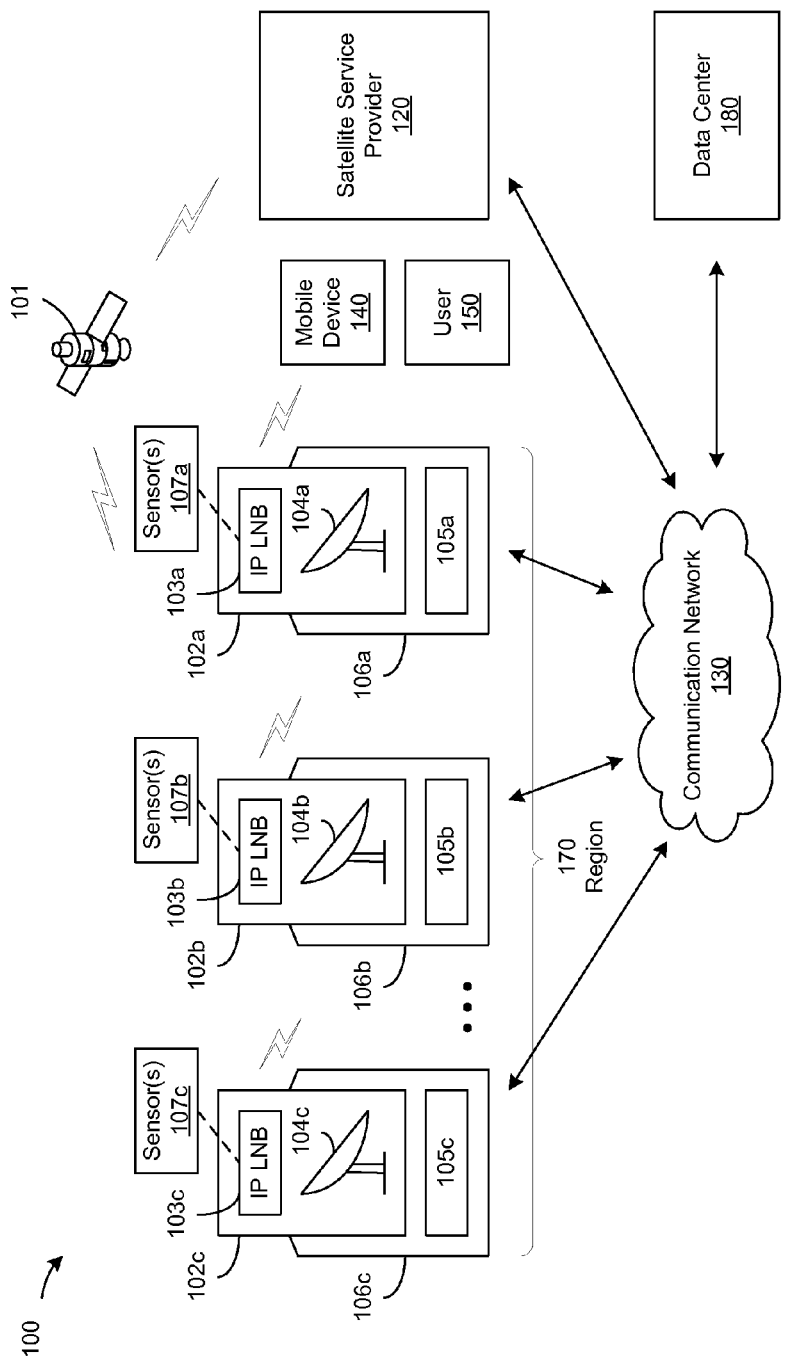
FIG. 1 is a block diagram illustrating an exemplary communication system, in accordance with an embodiment of the invention.

Certain embodiments of the invention can be found in a method and system for an Internet protocol LNB supporting sensors. In various embodiments of the invention, an Internet protocol low noise block downconverter (IP LNB) assembly, which is within a satellite dish assembly, may be operable to collect information received from one or more sensors that are integrated within or coupled to the IP LNB assembly. The IP LNB assembly may be operable to provide data and/or services associated with the satellite dish assembly based on the collected information received from the one or more sensors. In this regard, the one or more sensors may comprise, for example, a camera, an atmospheric sensor, a motion sensor, a directional sensor, an insolation sensor, an acoustic sensor and/or a seismic sensor. The one or more sensors may perform, for example, infrared (IR), cosmic radiation, ultraviolet (UV), far infrared (FIR), terahertz (THz) radiation, millimeter wave (MMW) and/or microwave sensing. The IP LNB assembly may be operable to store the collected information locally in the IP LNB assembly and/or remotely in a data center, for example. The IP LNB assembly may be operable to communicate, to at least a user or user device, one or more alarms based on temporal or spatial changes in the collected information received from the one or more sensors.

In an exemplary embodiment of the invention, weather related information collected from the atmospheric sensor may comprise temperature, humidity, precipitation, wind speed, wind direction and/or barometric pressure. The IP LNB assembly may be operable to generate historical weather data based on weather related information collected from the atmospheric sensor. The historical weather data may then be utilized to predict weather conditions, for example. The IP LNB assembly may also be operable to communicate, to at least a user or user device, a warning of possible violent storm and/or a warning of snow build-up, based on weather related information collected from the atmospheric sensor, for example.

In an exemplary embodiment of the invention, the IP LNB assembly may be operable to communicate, to at least a user or user device, live feed video and/or still images which may be captured by the camera. In such instances, the captured images, along with other images captured by other cameras associated with other IP LNB assemblies in a region, may be utilized for generating a map for the region. The IP LNB assembly may be operable to recognize one or more identifiable objects on the captured images, and communicate, to at least a user or user device, one or more alarms based on recognition of the one or more identifiable objects. The IP LNB assembly may also be operable to communicate, to at least a user or user device, an alarm and/or a notification based on motion information collected from the motion sensor.

In an exemplary embodiment of the invention, insolation information collected from the insolation sensor along with wind direction information collected from the atmospheric sensor may be utilized to predict available solar energy in a short term. The IP LNB assembly may be operable to communicate, to at least a user or user device, an alarm based on seismic information collected from the seismic sensor. The IP LNB assembly may also be operable to determine nearby traffic information and/or ballistic information based on acoustic information collected from the acoustic sensor.

In an exemplary embodiment of the invention, the IP LNB assembly may be operable to determine whether the satellite dish assembly is out of alignment based on directional information collected from the directional sensor. In instances when the satellite dish assembly is determined to be out of alignment, the IP LNB assembly may be operable to communicate the determination to a satellite service provider and/or a user or user device. The IP LNB assembly may also be operable to adjust the satellite dish assembly, via an alignment module in the IP LNB assembly, based on directional information collected from the directional sensor.

In some embodiments of the invention, the data and/or the services may be provided by the IP LNB assembly based on one or more particular applications which may be installed and running on the IP LNB assembly.

FIG. 1 is a block diagram illustrating an exemplary communication system, in accordance with an embodiment of the invention. Referring to FIG. 1, there is shown a communication system 100. The communication system 100 may comprise a satellite 101, a satellite service provider 120, a communication network 130, a data center 180 and a plurality of premises, of which the premises 106a-106c are illustrated. The premises 106a-106c may be, for example, houses, multi-dwelling units or offices. The premises 106a may comprise a satellite dish assembly 102a and a gateway 105a. The satellite dish assembly 102a may comprise an IP LNB assembly 103a and a dish 104a. The IP LNB assembly 103a may comprise one or more sensors 107a. The premises 106b may comprise a satellite dish assembly 102b and a gateway 105b. The satellite dish assembly 102b may comprise an IP LNB assembly 103b and a dish 104b. The IP LNB assembly 103b may comprise one or more sensors 107b. The premises 106c may comprise a satellite dish assembly 102c and a gateway 105c. The satellite dish assembly 102c may comprise an IP LNB assembly 103c and a dish 104c. The IP LNB assembly 103c may comprise one or more sensors 107c.

The satellite service provider 120 may comprise suitable logic, circuitry, interfaces and/or code that may be operable to communicate in various satellite bands. The satellite service provider 120 may provide satellite television services to the plurality of premises 106a-106c via the satellite 101. The satellite service provider 120 may also be referred to as a satellite headend.

The data center 180 may comprise suitable logic, circuitry, interfaces and/or code that may be operable to store information or data communicated from one or more IP LNB assemblies 103a-103c. The information or data may be collected from one or more sensors 107a-107c associated with corresponding one or more IP LNB assemblies 103a-103c. The collected information or data may be communicated to the data center 180 via the communication network 130, for example. The data center 180 may process and/or aggregate the information or data communicated from the one or more IP LNB assemblies 103a-103c. In an exemplary embodiment of the invention, the data center 180 may be collocated on or operated by a satellite service provider such as, for example, the satellite service provider 120.

A satellite dish assembly such as the satellite dish assembly 102a may receive satellite signals from the satellite 101 via the dish 104a. The IP LNB assembly 103a in the satellite dish assembly 102a may process the received satellite signals and communicate the processed signals or data to the gateway 105a. The IP LNB assembly 103a may communicate the processed signals to the gateway 105a via, for example, one or more cables such as coaxial cables.

An IP LNB assembly such as the IP LNB assembly 103a may comprise suitable logic, circuitry, interfaces and/or code that may be operable to process the received satellite signals. The IP LNB assembly 103a may be operable to downconvert the received satellite signals, channelize the downconverted signals, demodulate the channelized signals and convert the demodulated or recovered signals to digitized packets such as Internet protocol (IP) packets.

In an exemplary embodiment of the invention, the IP LNB assembly 103a may comprise one or more sensors 107a which may be integrated within or coupled to the IP LNB assembly 103a. The IP LNB assembly 103a may comprise a wireless interface module which may provide, for example, cellular, femtocell, picocell, WiMax and/or WiFi interfaces. For example, the IP LNB assembly 103a may provide connectivity with a mobile device such as the mobile device 140 via the wireless interface module. The IP LNB assembly 103a may interconnect, via the wireless interface module, with other IP LNB assemblies such as the IP LNB assemblies 103b-103c within the proximity of a neighborhood to establish a mesh network in a region such as the region 170. The IP LNB assembly 103a may comprise one or more antennas which may be integrated within or coupled to the wireless interface module. A plurality of antenna elements may be arranged as an antenna array. The IP LNB assembly 103a may comprise a wired interface module which may provide connectivity with the gateway 105a. The IP LNB assembly 103a may comprise a routing module. The routing module may be operable to route bandwidth among the satellite 101, the wireless interface module and the wired interface module. For example, the routing module may route satellite video content to destinations accessed through the wireless interface module and/or the wired interface module. The IP LNB assembly 103a may also comprise, for example, a global navigation satellite system (GNSS) module. For example, the GNSS module may comprise a global positioning system (GPS) unit.

A gateway such as the gateway 105a may comprise suitable logic, circuitry, interfaces and/or code that may be operable to process satellite data received from the IP LNB assembly 103a and output the data to an end-user device such as a television in the premises 106a. The gateway 105a may be operable to perform reception, processing and/or transmission of signals or data. The gateway 105a may communicate signals or data to and/or from among the IP LNB assembly 103a, the communication network 130 and/or a local area network (LAN) in the premises 106a. The gateway 105a may also be referred to as a receiver, a set-top box (STB) or a cable modem.

The communication network 130 may comprise suitable logic, circuitry, interfaces, devices and/or code that may be operable to provide wide area network (WAN) services via various communication technologies such as, for example, DOCSIS, DSL, Carrier Ethernet, ATM, Frame Relay, ISDN, x.25 and/or other suitable WN technology. For example, the communication network 130 may comprise an Internet network. In an exemplary embodiment of the invention, the communication network 130 may provide communication services to the premises 106a-106c and/or the satellite service provider 120.

In operation, the IP LNB assembly 103a, which is within the satellite dish assembly 102a, may be operable to collect information received from the one or more sensors 107a that are integrated within or coupled to the IP LNB assembly 103a. The IP LNB assembly 103a may be operable to provide data and/or services associated with the satellite dish assembly 102a based on the collected information received from the one or more sensors 107a. In this regard, the one or more sensors 107a may comprise, for example, a camera, an atmospheric sensor, a motion sensor, a directional sensor, an insolation sensor, an acoustic sensor and/or a seismic sensor. The camera may also be referred to, for example, as an optical CMOS sensor. The one or more sensors 107a may perform, for example, infrared (IR), cosmic radiation, ultraviolet (UV), far infrared (FIR), terahertz (THz) radiation, millimeter wave (MMW) and/or microwave sensing. The IP LNB assembly 103a may be operable to store the collected information locally in the IP LNB assembly 103a and/or remotely in the data center 180, for example. The IP LNB assembly 103a may be operable to communicate, to at least a user such as the user 150, one or more alarms based on temporal or spatial changes in the collected information received from the one or more sensors 107a. In this regard, for example, the changes may comprise temporal or spatial gradients in any of the collected information, or any temporal or spatial trending across various temporal or spatial scales. The one or more alarms may be communicated to a mobile device such as the mobile device 140 via the wireless interface module or to an end-user device such as a PC (in the LAN) via the wired interface module and the gateway 105a. The one or more alarms may also be communicated to the data center 180 via the communication network 130, for example.

In an exemplary embodiment of the invention, weather related information collected from the atmospheric sensor may comprise temperature, humidity, precipitation, wind speed, wind direction and/or barometric pressure. The IP LNB assembly 103a may be operable to generate and store (or communicate for storage elsewhere such as the data center 180) historical weather data based on the weather related information collected from the atmospheric sensor. The historical weather data may then be utilized (either alone or in aggregation with other historical weather data across a locality or region 170), for example, to predict weather conditions. For example, the predicted weather conditions based on the historical weather data may be consulted to predict yields and/or commodity pricing for a farmer. Current year conditions may be measured and compared against the historical weather data, and expected yields and thus pricing can be predicted. As one example, if it appears that from historical weather data that current conditions are not optimal to produce high yields in certain areas, the farmer may wish to sell at a higher price to take advantage of the expected or predicted limited supply. As another example, if it appears that from the historical weather data that current conditions are optimal to produce high yields, the farmer may be more inclined to sell expected yields at a lower price, given the expected or predicted increased supply.

The IP LNB assembly 103a may also be operable to communicate, to at least a user such as the user 150, a warning of possible violent storm (e.g., a tornado) based on weather related information (e.g., precipitation, wind speed, barometric pressure) collected from the atmospheric sensor (either alone or in aggregation with other weather related information collected from other local or regional atmospheric sensors). The IP LNB assembly 103a may also be operable to communicate, to at least the user 150, a warning of snow or ice build-up, for example, on the dish 104a and/or on a roof of the premises 106a, based on weather related information (e.g., temperature, precipitation) collected from the atmospheric sensor. In this regard, the warnings may be communicated to a mobile device such as the mobile device 140 via the wireless interface module or to an end-user device such as a PC (in the LAN) via the wired interface module and the gateway 105a. Neighborhoods may be warned of the possible violent storm via, for example, the mesh network in the region 170 or via one or more shared satellite channels in the region 170. In such instances, current weather conditions may be monitored and compared against the historical weather data that actually resulted in a violent storm. In instances when current conditions exist that are similar to such historical violent storm data, it may be an indication of a likelihood that a similar storm may occur, and an early violent storm warning may be triggered.

Since there may be a plurality of IP LNB assemblies 103a-103c in a given area such as the region 170, the collected weather data from the IP LNB assemblies 103a-103c may be processed and/or aggregated and utilized to provide accurate weather forecasts for the region 170. The data may be collected and time stamped based on the GNSS clock, for example. The stamped information may then be synchronized and processed to provide accurate forecasts. The historical weather data may be combined with the captured weather data to provide accurate weather models.

In an exemplary embodiment of the invention, the IP LNB assembly 103a may be operable to communicate, to at least the user 150 via, e.g., the mobile device 140 or some other end-user device, live feed video and/or still images which may be captured by the camera. The feed may be recorded for subsequent playback, for example. In such instances, the captured images, along with other images captured by other cameras associated with other IP LNB assemblies 103b-103c in the region 170, may be utilized for generating a map for the region 170. In this regard, the directional sensors and the GNSS modules in the IP LNB assemblies 103a-103c may determine the angles the cameras are pointing, the locations of the cameras and the heights of the cameras so that overlapping images may be captured. This may allow the creation of maps that may have a plurality of views. In other instances, the IP LNB assembly 103a may be operable to recognize one or more identifiable objects on the captured images, and communicate, to at least the user 150 via, e.g., the mobile device 140 or some other end-user device, one or more alarms based on recognition of the one or more identifiable objects. In this regard, the IP LNB assembly 103a may be operable to recognize or identify, for example, faces (e.g., utilizing face recognition), license plates (e.g., utilizing optical character recognition), animals (e.g., utilizing animal recognition) and/or other type of identifiable object.

The IP LNB assembly 103a may also be operable to communicate, to at least the user 150, via, e.g., the mobile device 140 or some other end-user device, an alarm and/or a notification based on motion information collected from the motion sensor. In this regard, the motion sensor may be utilized for security purposes to detect unwanted intrusion and trigger an alarm. The motion sensors along with the cameras and the GNSS modules from a plurality of IP LNB assemblies 103a-103c in the region 170 may be utilized to provide security services within the region 170. For example, the IP LNB assembly 103a may be operable to detect certain types of security threats, and accordingly notify people in the region 170 of the location and type of threat and declare an emergency situation. The IP LNB mesh network may be tied into a centralized emergency notification system, for example. A special satellite channel may be used for that purpose. A call or dispatch may be made based on the corresponding location of the IP LNB assembly 103a. A warning message may also be communicated to the end-user device such as the television in the premises 106a. The warning message may also be communicated to surrounding premises 106b-106c in the region 170 via the IP LNB mesh network, for example.

In an exemplary embodiment of the invention, insolation information collected from the insolation sensor along with wind direction information collected from the atmospheric sensor may be utilized to predict available solar energy in a short term. In this regard, the insolation information may comprise, for example, amount of sun and its angle of arrival on a given surface area at a given time. Based on the wind direction information and insolation patterns provided to a power company via, for example, the data center 180, the power company may be able to predict available solar energy in the short term for load balancing purposes, for example.

The IP LNB assembly 103a may be operable to communicate, to at least the user 150, via, e.g., the mobile device 140 or some other end-user device, an alarm based on seismic information collected from the seismic sensor. The seismic alarm and/or the seismic information may also be communicated elsewhere such as, for example, the data center 180. The collected seismic information may be valuable for understanding the geological structure underlying any given area such as the region 170. In this regard, the seismic sensor which is coupled to the IP LNB assembly 103a may be located on a stable portion of the satellite dish assembly 102a such as, for example, a base of a mast for the dish 104a.

The IP LNB assembly 103a may also be operable to determine nearby traffic information and/or ballistic information based on acoustic information collected from the acoustic sensor.

In an exemplary embodiment of the invention, the IP LNB assembly 103a may be operable to determine whether the satellite dish assembly 102a is out of alignment based on directional information collected from the directional sensor. In this regard, the directional sensor may comprise, for example, a 3D axis compass and/or a 3D axis gyroscope. In instances when the satellite dish assembly 102a is determined to be out of alignment, the IP LNB assembly 103a may be operable to communicate the determination to the satellite service provider 120 and/or the user 150. The IP LNB assembly 103a may also be operable to adjust the satellite dish assembly 102a, via an alignment module in the IP LNB assembly 103a, based on directional information collected from the directional sensor. In such instances, for example, the IP LNB assembly 103a may monitor the alignment of the satellite dish assembly 102a utilizing the directional sensor and/or the GNSS module, and compare the monitored alignment measurements against an initial set of alignment measurements established at installation or previous service repair. If the satellite dish assembly 102a is out of alignment, and depending on the amount of change, appropriate adjustment may be made by the IP LNB assembly 103a. The monitored settings may be communicated to the satellite service provider 120 and/or the user 150 for alignment services. For example, the user 150 and/or the satellite service provider 120 may be notified that the dish 104 is out of alignment by 5 degree based on measurements from the 3D axis compass.

The IP LNB assembly 103a may be operable to adjust the satellite dish assembly 102a, via an alignment module in the IP LNB assembly 103a. In this regard, the alignment module may comprise, for example, microelectromechanical system (MEMS) or piezo electric devices. For example, the MEMS or piezo electric devices may be utilized to electronically adjust field pattern of a feedhorn in the IP LNB assembly 103a to provide beam steering. In instances where there may be an antenna array within the IP LNB assembly 103a, the MEMS or piezo electric devices may be utilized to adjust the elements in the array, for example.

In some embodiments of the invention, the data and/or the services may be provided by the IP LNB assembly 103a based on one or more particular applications which may be installed and running on the IP LNB assembly 103a. In this regard, for example, the particular application(s) may be utilized to control the sensor(s) 107a and to collect and/or trade information received from the sensor(s) 107a. A client application may be run, for example, on the mobile device 140 to communicate with the particular application(s). A user interface (UI) on the mobile device 140 may be utilized by the user 150 to control or handle the data collected from the sensor(s) 107a. For example, the type of data to be collected and sold may be specified via the UI.

Figure 2:
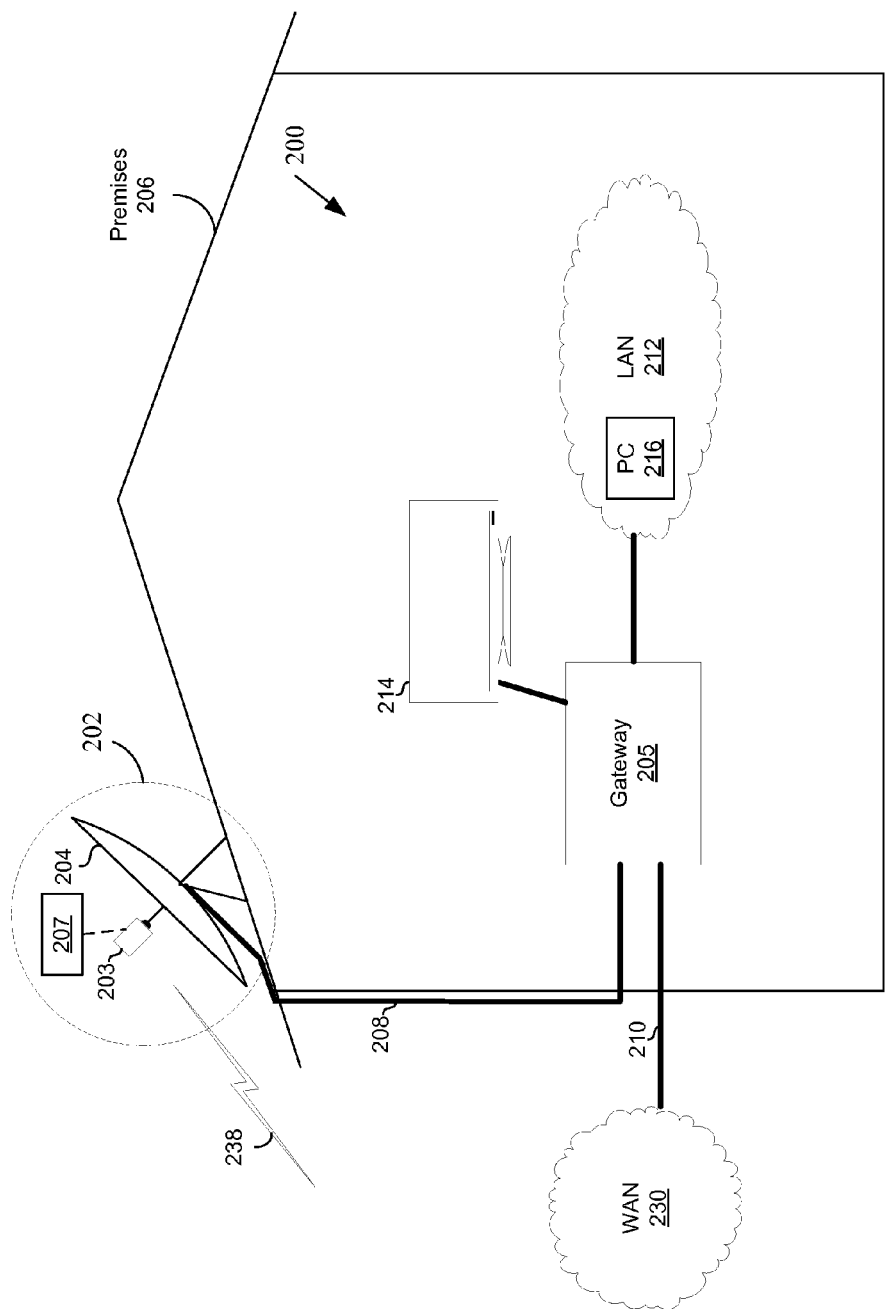
FIG. 2 is a block diagram illustrating an exemplary satellite television system, in accordance with an embodiment of the invention.

FIG. 2 is a block diagram illustrating an exemplary satellite television system, in accordance with an embodiment of the invention. Referring to FIG. 2, there is shown an in-premises network 200 that is located within the premises 206, a satellite dish assembly 202 and a wide area network (WAN) 230. The satellite dish assembly 202 may comprise an IP LNB assembly 203 and a dish 204. The IP LNB assembly 203 may comprise one or more sensors 207 which may be integrated within or coupled to the IP LNB assembly 203. There is also shown a network link 208 connecting the satellite dish assembly 203 and the in-premises network 200, a network link 110 connecting the in-premises network 200 and the WAN 230. The exemplary in-premises network 200 may comprise a gateway 205, a television 214 and a local area network (LAN) 212.

The premises 206 may be substantially the same as the premises 106a described with respect to FIG. 1, for example. The satellite dish assembly 202 may be substantially the same as the satellite dish assembly 102a described with respect to FIG. 1, for example. The dish 204 may be substantially the same as the dish 104a described with respect to FIG. 1, for example. The IP LNB assembly 203 may be substantially the same as the IP LNB assembly 103a described with respect to FIG. 1, for example. The sensor(s) 207 may be substantially the same as the sensor(s) 107a described with respect to FIG. 1, for example. The gateway 205 may be substantially the same as the gateway 105a described with respect to FIG. 1, for example. The WAN 230 may be substantially the same as the communication network 130 described with respect to FIG. 1, for example.

Each of the network links 208 and 210 may comprise one or more wired, wireless and/or optical links. The network link 208 may comprise, for example, a coaxial cable and/or a 60 GHz wireless link which carries physical layer symbols in accordance with, for example, multimedia over coax alliance (MoCA) or Ethernet standards. The network link 210 may comprise, for example, a coaxial cable or Cat 6 cable which carries physical layer symbols in accordance with, for example, DSL or Ethernet standards.

The television 214 may comprise suitable logic, circuitry, interfaces and/or code that may be operable to receive media and control data via one or more point-to-point media links (e.g., HDMI), process the received data and to recover audio and/or video, and present the audio and/or video to a user such as the user 150.

The LAN 212 may comprise suitable logic, circuitry, interfaces, devices and/or code that may be operable to provide network services within the premises 206. Devices such as, for example, a PC 216 in the LAN 212 may communicate utilizing, for example, MoCA, IEEE 802.11 and/or Ethernet protocols.

In operation, the dish 204 may receive one or more satellite television signals, each of which may be comprised of one or more channels. The signals may be processed by the IP LNB assembly 203 to recover one or more of the channels carried in the received signals. The processing of the received satellite signals by the IP LNB assembly 203 may comprise downconverting the received satellite signals, channelizing the downconverted signals, demodulating the channelized signals and converting the demodulated or recovered signals to digitized packets such as Internet protocol (IP) packets. The processed signals or data may be communicated from the IP LNB assembly 203 to the gateway 205 via the network link 208. The gateway 205 may then process the received signals or data for distribution to the television 214 and/or to an end-user device such as the PC 216 in the LAN 212. The gateway 205 may also be operable to route the received signals or data to the WAN 230 via the network link 210. The IP LNB assembly 203 may also communicate processed signals or data to a mobile device such as the mobile device 140 or an IP LNB assembly such as the IP LNB assembly 103*b* within the proximity of a neighborhood, via a wireless link such as the wireless link 238.

The IP LNB assembly 203 may be operable to collect information received from the one or more sensors 207. In this regard, the one or more sensors 207 may comprise, for example, a camera, an atmospheric sensor, a motion sensor, a directional sensor, an insolation sensor, an acoustic sensor and/or a seismic sensor.

In an exemplary embodiment of the invention, the IP LNB assembly 203 may be operable to generate and store (or communicate for storage elsewhere such as a data center 180) historical weather data based on weather related information collected from the atmospheric sensor. The historical weather data may then be utilized, for example, to predict weather conditions. The IP LNB assembly 203 may also be operable to communicate, to at least a user such as the user 150, a warning of possible violent storm (e.g., a tornado) and/or a warning of snow or ice build-up, based on weather related information collected from the atmospheric sensor. In this regard, the warning may be communicated to the mobile device 140 via the wireless link 238 or to an end-user device such as the PC 216 in the LAN 212 via the network link 208 and the gateway 205. Neighborhoods may be warned of the possible violent storm via, for example, the wireless link 238 and/or via the network links 208, 210 and the WAN 230.

In an exemplary embodiment of the invention, the IP LNB assembly 203 may be operable to communicate, to at least the user 150, live feed video and/or still images which may be captured by the camera. The feed may be recorded, for example, in the gateway 205 for subsequent playback. In this regard, the feed may be communicated to the mobile device 140 via the wireless link 238 or to an end-user device such as the television 214 or the PC 216 in the LAN 212 via the network link 208 and the gateway 205. Neighborhoods may also receive the feed via, for example, the wireless link 238 and/or via the network links 208, 210 and the WAN 230. In such instances, the captured images, along with other images captured by other cameras associated with other IP LNB assemblies such as the IP LNB assemblies 103*b*-103*c* in a region such as the region 170, may be utilized for generating a map for the region 170. In other instances, the IP LNB assembly 203 may be operable to recognize or identify one or more identifiable objects, such as faces, license plates or animals, on the captured images. The IP LNB assembly 203 may be operable to communicate, to at least the user 150 via, e.g., the mobile device 140 or some other end-user device, one or more alarms based on recognition of the one or more identifiable objects. In this regard, the one or more alarms may be communicated to the mobile device 140 via the wireless link 238, for example. The one or more alarms may be communicated to an end-user device such as the television 214 via the network link 208 and the gateway 205, for example.

The IP LNB assembly 203 may also be operable to communicate, to at least the user 150, an alarm and/or a notification based on motion information collected from the motion sensor. In this regard, the motion sensor may be utilized for security purposes to detect unwanted intrusion and trigger an alarm. For example, a warning message may be communicated to an end-user device such as the television 214 via the network link 208 and the gateway 205. The warning message may be communicated to the mobile device 140 via the wireless link 238, for example. The warning message may also be communicated to surrounding premises such as the premises 106*b*-106*c* in the region 170 via, for example, the wireless link 238 and/or via the network links 208, 210 and the WAN 230.

The IP LNB assembly 203 may be operable to communicate, to at least the user 150, via, e.g., the mobile device 140 or some other end-user device, an alarm based on seismic information collected from the seismic sensor. The seismic alarm and/or the seismic information may also be communicated elsewhere such as, for example, the data center 180. In this regard, the seismic sensor which is coupled to the IP LNB assembly 203 may be located on a stable portion of the satellite dish assembly 202, for example. The seismic alarm may be communicated to the mobile device 140 via the wireless link 238, for example. The seismic alarm may be communicated to an end-user device such as the television 214 via the network link 208 and the gateway 205, for example. The seismic alarm and/or the seismic information may be communicated to the data center 180 via the network links 208, 210 and the WAN 230, for example.

In an exemplary embodiment of the invention, the IP LNB assembly 203 may be operable to determine whether the satellite dish assembly 202 is out of alignment based on directional information collected from the directional sensor such as, for example, the 3D axis compass or the 3D axis gyroscope. In instances when the satellite dish assembly 202 is determined to be out of alignment, the IP LNB assembly 203 may be operable to communicate the determination to a satellite service provider such as the satellite service provider 120 and/or to the user 150. The IP LNB assembly 203 may also be operable to adjust the satellite dish assembly 202, via an alignment module in the IP LNB assembly 203, based on directional information collected from the directional sensor. In such instances, for example, the user 150 and/or the satellite service provider 120 (and/or a corresponding technician) may be notified that the alignment of the satellite dish assembly 202 is off based on measurements from the 3D axis compass. Depending on the amount of change, the IP LNB assembly 203 may be operable to adjust the satellite dish assembly 202, via an alignment module in the IP LNB assembly 203. In this regard, the alignment module may comprise, for example, MEMS or piezo electric devices.

In some embodiments of the invention, the above mentioned data and/or services may be provided by the IP LNB assembly 203 based on one or more particular applications which may be installed and running on the IP LNB assembly 203. In this regard, for example, the particular application(s) may be utilized to control the sensor(s) 207 and to collect and/or trade information received from the sensor(s) 207. The user 150 may utilize the mobile device 140 to communicate with the particular application(s) via the wireless link 238 so as to control or handle the data collected from the sensor(s) 207.

Figure 3:
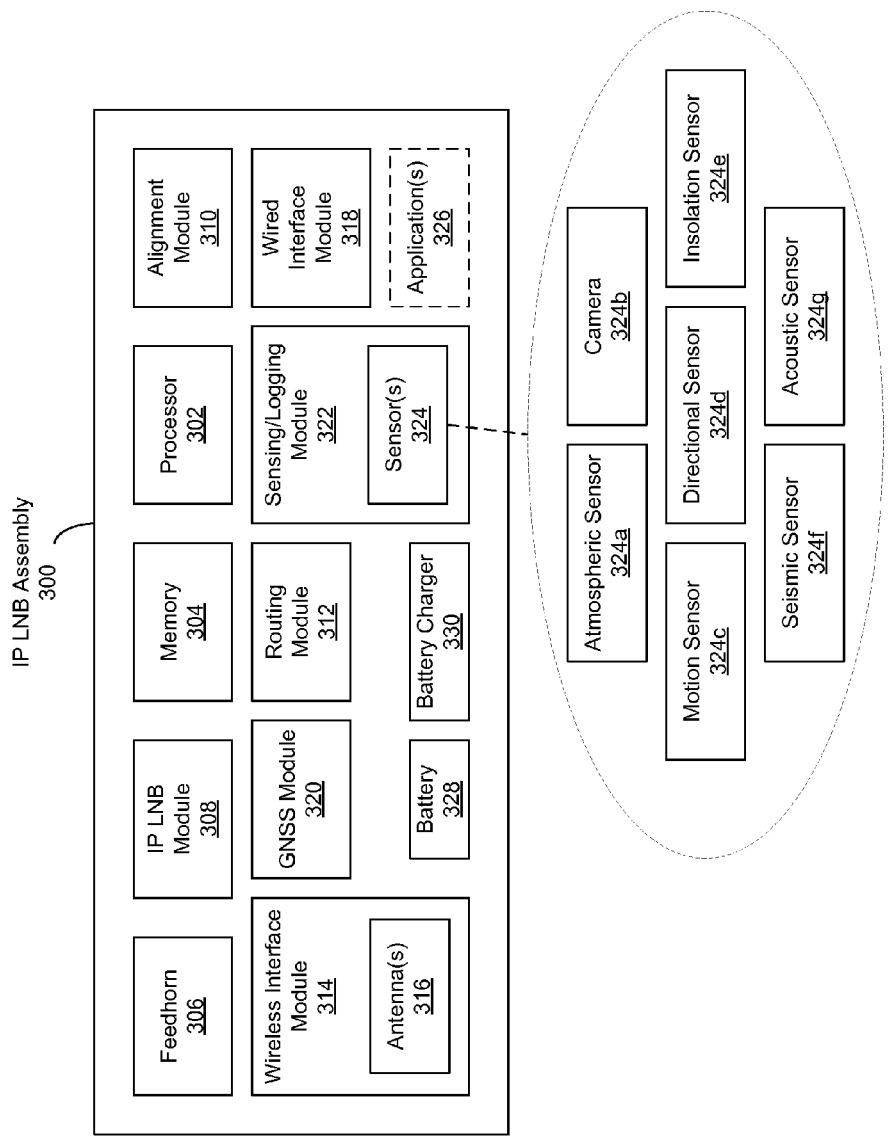
FIG. 3 is a block diagram illustrating an exemplary Internet protocol LNB assembly, in accordance with an embodiment of the invention.

FIG. 3 is a block diagram illustrating an exemplary Internet protocol LNB assembly, in accordance with an embodiment of the invention. Referring to FIG. 3, there is shown an IP LNB assembly 300. The IP LNB assembly 300 may be substantially the same as the IP LNB assembly 203 described with respect to FIG. 2 and the IP LNB assembly 103a described with respect to FIG. 1, for example. The IP LNB assembly 300 may comprise a processor 302, a memory 304, a feedhorn 306, an IP LNB module 308, an alignment module 310, a routing module 312, a wireless interface module 314, a wired interface module 318, a GNSS module 320, a sensing/logging module 322, a backup battery 328 and a battery charger 330. The wireless interface module 314 may comprise one or more antennas 316. The sensing/logging module 322 may comprise one or more sensors 324. The IP LNB assembly 300 may also comprise one or more particular applications 326 installed and running on the IP LNB assembly 300.

The processor 302 may comprise suitable logic, circuitry, interfaces and/or code that may be operable to manage and/or control operations of various components and/or modules in the IP LNB assembly 300. The processor 302 may utilize an operating system that enables the execution of various applications such as, for example, the particular application(s) 326.

The memory 304 may comprise suitable logic, circuitry, interfaces and/or code that may be operable to store information such as executable instructions and/or data that may be utilized by the processor 302 and/or other modules or components in the IP LNB assembly 300. The memory 304 may comprise RAM, ROM, low latency nonvolatile memory such as flash memory and/or other suitable electronic data storage.

The feedhorn 306 may comprise suitable logic, circuitry, interfaces and/or code that may be operable to gather satellite signals which may be received from a satellite such as the satellite 101 via a satellite dish such as the dish 204. The feedhorn 306 may direct the gathered satellite signals to the IP LNB module 308 for processing.

The IP LNB module 308 may comprise suitable logic, circuitry, interfaces and/or code that may be operable to process the satellite signals gathered by the feedhorn 306. The IP LNB module 308 may be operable to downconvert the received satellite signals, channelize the downconverted signals, demodulate the channelized signals and convert the demodulated or recovered signals to digitized data such as IP packets. The IP LNB module 308 may process the signals employing one or more full-spectrum capture (FSC) receivers in the IP LNB module 308.

The alignment module 310 may comprise suitable logic, circuitry, interfaces and/or code that may be operable to perform alignment functions for the IP LNB assembly 300 and/or the dish 204. In an exemplary embodiment of the invention, the alignment module 310 may comprise MEMS or piezo electric devices.

The routing module 312 may comprise suitable logic, circuitry, interfaces and/or code that may be operable to selectively route data and/or signals among the IP LNB module 308, the wireless interface module 314 and the wired interface module 318. The routing may be based on IP addresses, TCP/UDP port numbers, packet identifiers (PIDs), stream identifiers and/or any other suitable field or information. For example, the routing module 312 may route satellite video content to end-user devices accessed through the wireless interface module 318 and/or the wired interface module 318.

The wireless interface module 314 may comprise suitable logic, circuitry, interfaces and/or code that may be operable to establish one or more wireless connections, such as the wireless link 238, with one or more mobile devices such as the mobile device 140. The connections may utilize any suitable wireless protocol(s) such as, for example, cellular, femtocell, picocell, WiMax and/or WiFi. In an exemplary embodiment of the invention, the wireless interface module 314 may be implemented as a small-cell basestation such as, for example, a femtocell or a picocell basestation. The wireless interface module 314 may comprise one or more antennas 316. The antenna(s) 316 may be integrated within or coupled to the IP LNB assembly 300. The antenna(s) 316 may be arranged as an antenna array.

The wired interface module 318 may comprise suitable logic, circuitry, interfaces and/or code that may be operable to communicate data via one or more cables such as the network link 208 with a gateway such as the gateway 205. For example, the wired interface module 318 may be operable to output, via the cable(s), the signals or data received from the IP LNB module 308 to the gateway 205. The wired interface module 318 may be able to communicate over the cable(s) utilizing Ethernet, MoCA and/or any other suitable protocol(s).

The GNSS module 320 may comprise suitable logic, circuitry, interfaces and/or code that may be operable to detect and receive GNSS signals or data from one or more GNSS satellites. The GNSS module 320 may be operable to generate location information and/or time information associated with the IP LNB assembly 300.

The sensing/logging module 322 may comprise suitable logic, circuitry, interfaces and/or code that may be operable to collect information received from one or more sensors 324. The sensor(s) 324 may be integrated within or coupled to the sensing/logging module 322 in the IP LNB assembly 300. The sensing/logging module 322 may store the collected information received from the sensor(s) 324. In an exemplary embodiment of the invention, the sensor(s) 324 may comprise, for example, an atmospheric sensor 324a, a camera 324b, a motion sensor 324c, a directional sensor 324d, an insolation sensor 324e, a seismic sensor 324f and/or an acoustic sensor 324g. The atmospheric sensor 324a may provide weather related information such as, for example, temperature, humidity, barometric pressure, wind speed, wind direction and/or precipitation. The camera 324b may also be referred to as an optical CMOS sensor, for example. The directional sensor 324d may comprise, for example, a 3D axis compass and/or a 3D axis gyroscope. The insolation sensor 324e may comprise, for example, a pyranometer. The seismic sensor 324f may comprise, for example, a 3D axis accelerometer and/or a seismometer, for example. The acoustic sensor 324g may comprise, for example, a microphone.

The backup battery 328 may be operable to provide backup power to the IP LNB assembly 300 in instances when the IP LNB assembly 300 loses AC power. The battery charger 330 may comprise circuitry that may be operable to keep the backup battery 328 charged.

In operation, the feedhorn 306 may be operable to gather satellite signals received from the satellite 101 via the dish 204. The feedhorn 306 may direct the gathered satellite signals to the IP LNB module 308 for processing. The processing of the received satellite signals by the IP LNB module 308 may comprise downconverting the received satellite signals, channelizing the downconverted signals, demodulating the channelized signals and converting the demodulated or recovered signals to digitized data such as IP packets. The processed signals or data may be routed, by the routing module 312, from the IP LNB module 308 to the wired interface module 318 and/or the wireless interface module 314. The sensing/logging module 322 may be operable to collect information received from the one or more sensors 324. In this regard, the one or more sensors 324 may comprise, for example, a camera 324b, an atmospheric sensor 324a, a motion sensor 324, a directional sensor 324d, an insolation sensor 324e, a seismic sensor 324f and/or an acoustic sensor 324g. The one or more sensors 324 may perform, for example, infrared (IR), cosmic radiation, ultraviolet (UV), far infrared (FIR), terahertz (THz) radiation, millimeter wave (MMW) and/or microwave sensing. The sensing/logging module 322 may be operable to store the collected information received from the sensor(s) 324.

In an exemplary embodiment of the invention, the sensing/logging module 322 may be operable to generate and store (or communicate for storage elsewhere such as a data center 180) historical weather data based on weather related information collected from the atmospheric sensor 324a. In this regard, the weather related information may comprise, for example, temperature, humidity, barometric pressure, wind speed, wind direction and/or precipitation. The historical weather data may then be utilized, for example, to predict weather conditions. The IP LNB assembly 300 may also be operable to communicate, to at least a user such as the user 150, a warning of possible violent storm (e.g., a tornado) based on weather related information (e.g., precipitation, wind speed and/or barometric pressure) collected from the atmospheric sensor 324a. The IP LNB assembly 300 may also be operable, to communicate, to at least the user 150, a warning of snow or ice build-up, for example, on the dish 204 and/or on a roof of the premises 206, based on weather related information (e.g., temperature, precipitation) collected from the atmospheric sensor 324a. In this regard, the warnings may be communicated to the mobile device 140 associated with the user 150 via the wireless interface module 314 or to the gateway 205 in a premises such as the premises 206 of the user 150, via the wired interface module 318. Neighborhoods may also be warned of the possible violent storm via, for example, the wireless interface module 314 and/or the wired interface module 318 (and through a WAN such as the WAN 230).

In an exemplary embodiment of the invention, the IP LNB assembly 300 may be operable to communicate, to at least the user 150, live feed video and/or still images which may be captured by the camera 324b. In this regard, the feed may be communicated to the mobile device 140 via the wireless interface module 314 or to the gateway 205 via the wired interface module 318. Neighborhoods may also receive the feed via, for example, the wireless interface module 314 and/or via the wired interface module 318 (and through the WAN 230). In such instances, the captured images, along with other images captured by other cameras associated with other IP LNB assemblies such as the IP LNB assemblies 103b-103c in a region such as the region 170, may be utilized for generating a map for the region 170. In other instances, the processor 302 in the IP LNB assembly 300 may be operable to recognize or identify one or more identifiable objects (e.g., faces, license plates or animals) on the captured images. The IP LNB assembly 300 may then be operable to communicate, to at least the user 150 via, e.g., the mobile device 140 or some other end-user device, one or more alarms based on recognition of the one or more identifiable objects. In this regard, the one or more alarms may be communicated to the mobile device 140 via the wireless interface module 314, for example. The one or more alarms may be communicated to an end-user device such as the television 214 via the wired interface module 318 (and through the gateway 205), for example.

The IP LNB assembly 300 may also be operable to communicate, to at least the user 150, an alarm and/or a notification based on motion information collected from the motion sensor 324c. In this regard, the motion sensor 324c may be utilized for security purposes to detect unwanted movement and trigger an alarm or a warning notification. For example, a warning notification may be communicated to the gateway 205 via the wired interface module 318. The warning notification may be communicated to the mobile device 140 via the wireless interface module 314, for example. The warning notification may also be communicated to surrounding premises such as the premises 106b-106c in the region 170 via, for example, the wireless interface module 314 and/or via the wired interface module 318 (and through the WAN 230).

In an exemplary embodiment of the invention, insolation information collected from the insolation sensor 324e along with wind direction information collected from the atmospheric sensor 324a may be utilized to predict available solar energy in a short term. Based on the wind direction information and insolation patterns provided to a power company via, for example, the data center 180, the power company may be able to predict available solar energy in the short term for load balancing purposes, for example. The information collected from the insolation sensor 324e and/or the information collected from the atmospheric sensor 324a may be communicated to the data center 180 via, for example, the wired interface module 318 (and through the WAN 230), for example.

The IP LNB assembly 300 may be operable to communicate, to at least the user 150, via, e.g., the mobile device 140 or some other end-user device, an alarm based on seismic information collected from the seismic sensor 324f. The seismic alarm and/or the seismic information may also be communicated elsewhere such as, for example, the data center 180. In this regard, the seismic sensor 324f which is coupled to the IP LNB assembly 300 may be located on a stable portion of an associated satellite dish assembly such as the satellite dish assembly 202, for example. The seismic alarm may be communicated to the mobile device 140 via the wireless interface module 314, for example. The seismic alarm may be communicated to an end-user device such as the television 214 via the wired interface module 318 (and through the gateway 205), for example. The seismic alarm and/or the seismic information may be communicated to the data center 180 via the wired interface module 318 (and through the WAN 230), for example.

The processor 302 in the IP LNB assembly 300 may also be operable to determine nearby traffic information and/or ballistic information based on acoustic information collected from the acoustic sensor 324g.

In an exemplary embodiment of the invention, the processor 302 in the IP LNB assembly 300 may be operable to determine whether the associated satellite dish assembly such as the satellite dish assembly 202 is out of alignment based on directional information collected from the directional sensor 324d such as, for example, the 3D axis compass or the 3D axis gyroscope. In instances when the satellite dish assembly 202 is determined to be out of alignment, the IP LNB assembly 300 may be operable to communicate the determination to a satellite service provider such as the satellite service provider 120 (and/or a corresponding technician) and/or to the user 150. The IP LNB assembly 300 may communicate the determination and the monitored alignment information to the satellite service provider 120 and/or to the user 150 via the wireless interface module 314 and/or the wired interface module 318. The alignment module 310 in the IP LNB assembly 300 may be operable to adjust the satellite dish assembly 202, based on directional information collected from the directional sensor 324d. In such instances, for example, the user 150 and/or the satellite service provider 120 may be notified that the alignment of the satellite dish assembly 202 is off based on measurements from the 3D axis compass. In some instances, the alignment module 310 may be operable to adjust the satellite dish assembly 202 employing, for example, MEMS or piezo electric devices. For example, the MEMS or piezo electric devices may be utilized by the alignment module 310 to electronically adjust field pattern of the feedhorn 306 in the IP LNB assembly 300 to provide beam steering. The MEMS or piezo electric devices may also be utilized by the alignment module 310 to adjust the elements in the antenna array 316, for example.

In some embodiments of the invention, the above mentioned data and/or services may be provided by the IP LNB assembly 300 based on one or more particular applications 326 which may be installed and running on the IP LNB assembly 300. In this regard, for example, the particular application(s) 326 may be utilized to control the sensor(s) 324 and to collect and/or trade information received from the sensor(s) 324. The user 150 may utilize the mobile device 140 to communicate with the particular application(s) 326 via the wireless interface module 314 so as to control or handle the information collected from the sensor(s) 324.

Figure 4:
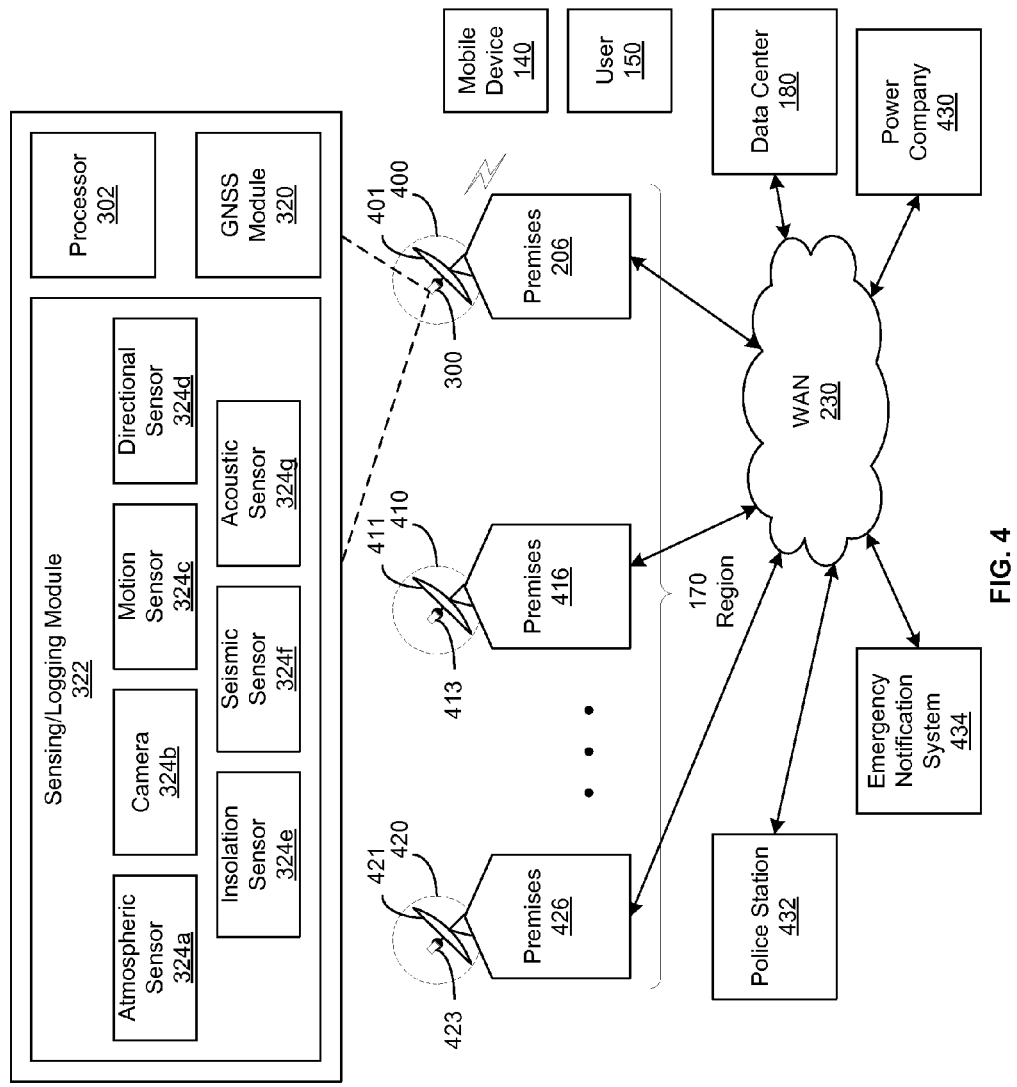
FIG. 4 is a diagram illustrating exemplary scenarios of an Internet protocol LNB assembly providing data/services, in accordance with an embodiment of the invention.

FIG. 4 is a diagram illustrating exemplary scenarios of an Internet protocol LNB assembly providing data/services, in accordance with an embodiment of the invention. Referring to FIG. 4, there is shown the premises 206, the WAN 203, the data center 180, a satellite dish assembly 400 collocated on the premises 206, a power company 430, a police station 432 and an emergency notification system 434. The premises 206 and the WAN 230 may be as described with respect to FIG. 2, for example. The data center 180 may be as described with respect to FIG. 1, for example. The satellite dish assembly 400 may be substantially the same as the satellite dish assembly 202 described with respect to FIG. 2, for example. In this regard, the satellite dish assembly 400 may comprise the IP LNB assembly 300 and a dish 401. The IP LNB assembly 300 may be as described with respect to FIG. 3, for example. The dish 401 may be substantially the same as the dish 204, which is described with respect to FIG. 2.

There is also shown, in FIG. 4, a plurality of other premises, such as the premises 416, 426 in a region such as the region 170. The premises 416 may comprise a satellite dish assembly 410. The satellite dish assembly 410 may comprise an IP LNB assembly 413 and a dish 411. The premises 426 may comprise a satellite dish assembly 420. The satellite dish assembly 420 may comprise an IP LNB assembly 423 and a dish 421.

In an exemplary operation, the sensing/logging module 322 in the IP LNB assembly 300 may be operable to generate historical weather data based on weather related information collected from the atmospheric sensor 324a. The generated historical weather data may be stored locally by the sensing/logging module 322. The historical weather data may then be utilized, for example, to predict weather conditions. The generated historical weather data may also be communicated, for example, via the WAN 230, to the data center 180. In this regard, the data center 180 may process and/or aggregate the historical weather data with other historical weather data received across the region 170. The data center 180 may then communicate the aggregated historical weather data to the premises 206, 416, 426 in the region 170 for predicting weather conditions, for example. In an exemplary embodiment of the invention, the data center 180 may be collocated on or operated by a satellite service provider such as, for example, the satellite service provider 120.

The weather related information (e.g., precipitation, wind speed and/or barometric pressure) collected from the atmospheric sensor 324a may be utilized to provide a warning of possible violent storm. The weather related information (e.g., temperature and/or precipitation) collected from the atmospheric sensor 324a may also be utilized to provide a warning of snow or ice build-up, for example, on the dish 401 and/or on a roof of the premises 206. The collected information or data may be time stamped based on a GNSS clock provided by the GNSS module 320 in the IP LNB assembly 300, for example. The IP LNB assembly 300 may be operable to provide the warning to a user such as the user 150 via, for example a mobile device such as the mobile device 140. The weather related information and/or the warning information may also be communicated to the data center 180. The data center 180 may process and/or aggregate the received information with other weather related information collected from other atmospheric sensors in the region 170, for example. The data center 180 may then be able to provide accurate weather forecasts and/or warnings for the region 170. In this regard, for example, the premises 206, 416, 426 in the region 170 may be warned of the possible violent storm via one or more shared satellite channels in the region 170.

The one or more cameras 324b may be operable to capture live feed video and/or still images. The captured images may be communicated to the user 150 via, for example, the mobile device 140 or some other end-user device. Based on recognition of one or more identifiable objects (e.g., faces, license plates, animals) on the captured images, one or more alarms may also be communicated to the user 150 via, for example, the mobile device 140 or some other end-user device, for example. The motion sensor 324c may be operable to collect motion information. An alarm and/or a notification may be communicated to the user 150 based on the collected motion information, via, for example, the mobile device 140 or some other end-user device. The captured images, the alarms, the notification and location information (e.g., identified by the GNSS module 320) may be communicated, for example, via the WAN 230, to the police station 432 and/or to the emergency notification system 434. In an exemplary embodiment of the invention, the emergency notification system 434 may be operated by the police station 432 or by the satellite service provider 120. The emergency notification system 434 may be operable to communicate security warnings or notifications to the premises 206, 416, 426 in the region 170. In this regard, the motion sensors along with the cameras and the GNSS modules from a plurality of IP LNB assemblies 300, 413, 423 in the region 170 may be utilized to provide security services within the region 170.

The IP LNB assembly 300 may be operable to communicate Insolation information collected from the insolation sensor 324e to, for example, the data center 180. The data center 180 may process and/or aggregate the insolation information with other insolation information received across the region 170. The insolation information along with wind direction information may be utilized to predict available solar energy in a short term. For example, based on the wind direction information and insolation patterns provided to a power company such as the power company 430 via, for example, the data center 180, the power company 430 may be able to predict available solar energy in the short term for load balancing purposes.

Acoustic information may be collected from the acoustic sensor 324g. The processor 302 in the IP LNB assembly 300 may be operable to determine, for example, nearby traffic information and/or ballistic information based on the acoustic information collected from the acoustic sensor 324g. For example, based on time information and location information provided by the GNSS module 320, the traffic information and/or the ballistic information may be determined utilizing, for example, triangulation.

Figure 5:
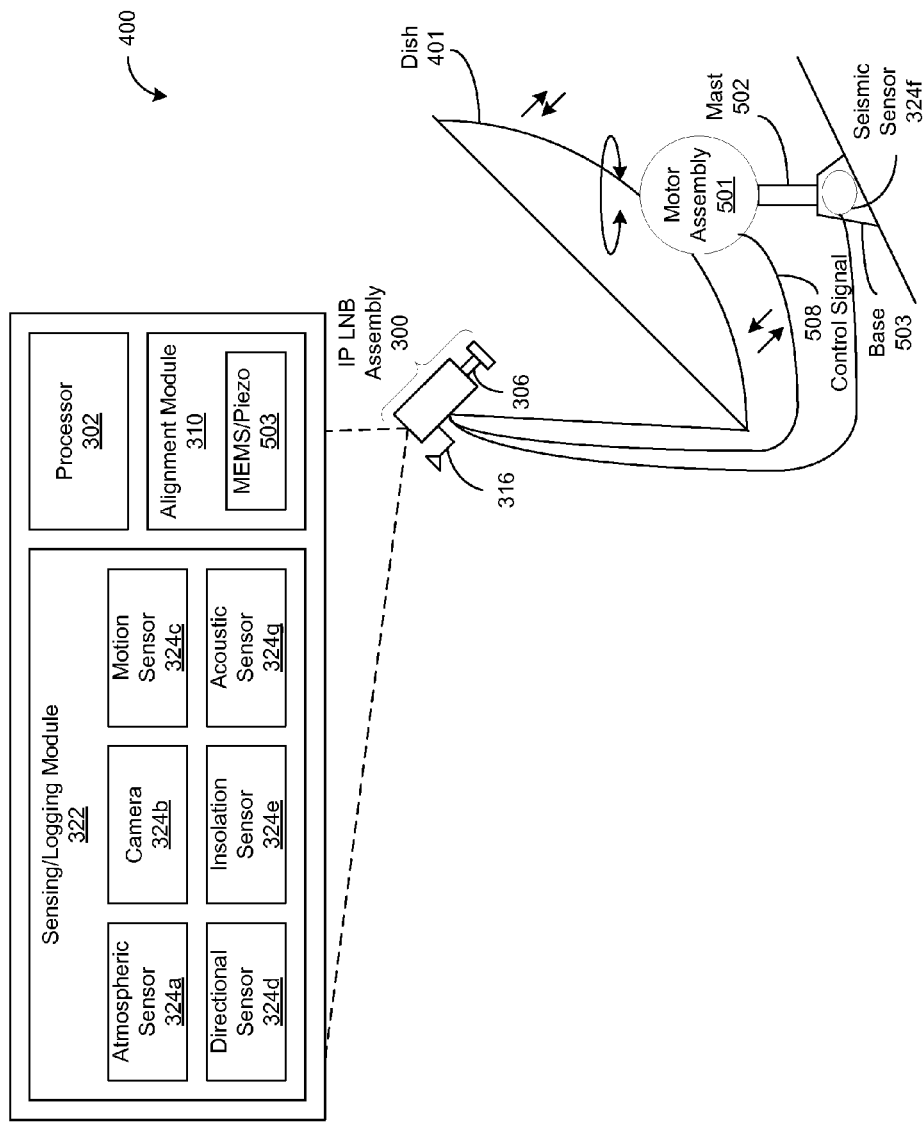
FIG. 5 is a diagram illustrating exemplary scenarios of an Internet protocol LNB assembly providing data/services, in accordance with an embodiment of the invention.

FIG. 5 is a diagram illustrating exemplary scenarios of an Internet protocol LNB assembly providing data/services, in accordance with an embodiment of the invention. Referring to FIG. 5, there is shown the satellite dish assembly 400. The satellite dish assembly 400 may be as described with respect to FIG. 4, for example. The satellite dish assembly 400 may comprise the dish 401, the IP LNB assembly 300 and a motor assembly 501. The motor assembly 501 may comprise, for example, an elevation motor and/or an azimuth motor. The motor assembly 501 may be operable to adjust the dish 401 for alignment. The IP LNB assembly 300 may be as described with respect to FIG. 3, for example. In this regard, the alignment module 310 in the IP LNB assembly 300 may comprise MEMS or piezo electric devices 503.

In an exemplary operation, the directional sensor 324d such as, for example, a 3D axis compass or a 3D axis gyroscope, may be operable to collect alignment information of the satellite dish assembly 400. In instances when the processor 302 in the IP LNB assembly 300 determines that the satellite dish assembly 400 is out of alignment based on the collected alignment information, the alignment module 310 in the IP LNB assembly 300 may be operable, for example, to adjust the satellite dish assembly 400. In this regard, for example, the MEMS or piezo electric devices 503 may be employed to electronically adjust the feedhorn 306. The MEMS or piezo electric devices 503 may be employed to adjust the elements in the antenna array 316. The alignment module 310 may also utilize the MEMS or piezo electric devices 503 to provide a control signal 508 to the motor assembly 501 for adjusting the dish 401.

The seismic sensor 324f which is coupled to the sensing/logging module 322 in the IP LNB assembly 300 may be located on a stable portion of the satellite dish assembly 400 such as, for example, a base 503 of a mast 502 for the dish 401. The IP LNB assembly 300 may be operable to communicate, to at least a user such as the user 150, via, e.g., an associated mobile device such as the mobile device 140, an alarm based on seismic information collected from the seismic sensor 324f. The seismic alarm and/or the seismic information may also be communicated elsewhere such as, for example, a data center 180.

Figure 6:
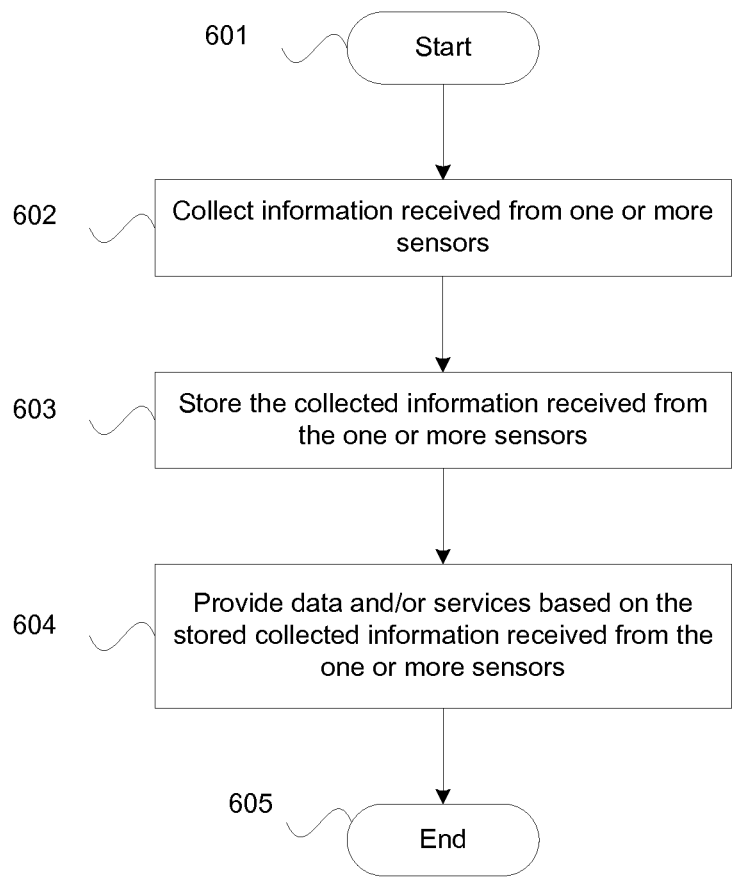
FIG. 6 is a flow chart illustrating exemplary steps for an Internet protocol LNB supporting sensors, in accordance with an embodiment of the invention.

FIG. 6 is a flow chart illustrating exemplary steps for an Internet protocol LNB supporting sensors, in accordance with an embodiment of the invention. Referring to FIG. 6, the exemplary steps start at step 601. In step 602, the sensing/logging module 322 in the IP LNB assembly 300 may be operable to collect information received from one or more sensors 324. The sensor(s) 324 may be integrated within or coupled to the IP LNB assembly 300. The IP LNB assembly 300 may be operational within, for example, the satellite dish assembly 400. In step 603, the sensing/logging module 322 may be operable to store the collected information received from the one or more sensors 324. The collected information received from the one or more sensors 324 may also be communicated for storage remotely such as in the data center 180. In step 604, the processor 302 in the IP LNB assembly 300 may be operable to provide data and/or services associated with the satellite dish assembly 400 based on the stored collected information received from the one or more sensors 324. The exemplary steps may proceed to the end step 605.

In various embodiments of the invention, an IP LNB assembly such as the IP LNB assembly 300 may be operational within a satellite dish assembly such as the satellite dish assembly 400. A sensing/logging module 322 in the IP LNB Assembly 300 may be operable to collect information received from one or more sensors 324 that are integrated within or coupled to the IP LNB assembly 300. A processor such as the processor 302 in the IP LNB assembly 300 may be operable to provide data and/or services associated with the satellite dish assembly 400 based on the collected information received from the one or more sensors 324. In this regard, the one or more sensors 324 may comprise, for example, a camera 324b, an atmospheric sensor 324a, a motion sensor 324c, a directional sensor 324d, an insolation sensor 324e, an acoustic sensor 324g and/or a seismic sensor 324f. The one or more sensors 324a-324g may perform, for example, infrared (IR), cosmic radiation, ultraviolet (UV), far infrared (FIR), terahertz (THz) radiation, millimeter wave (MMW) and/or microwave sensing. The IP LNB assembly 300 may be operable to store the collected information locally in the sensing/logging module 322 and/or remotely in a data center such as the data center 180, for example. The IP LNB assembly 300 may be operable to communicate, to at least a user such as the user 150, one or more alarms based on temporal or spatial changes in the collected information received from the one or more sensors 324a-324g.

Weather related information collected from the atmospheric sensor 324a may comprise, for example, temperature, humidity, precipitation, wind speed, wind direction and/or barometric pressure. The sensing/logging module 322 may be operable to generate historical weather data based on weather related information collected from the atmospheric sensor 324a. The historical weather data may then be utilized, for example, to predict weather conditions. The IP LNB assembly 300 may also be operable to communicate, to at least a user such as the user 150, a warning of possible violent storm and/or a warning of snow build-up, based on weather related information collected from the atmospheric sensor 324a, for example.

The IP LNB assembly 300 may be operable to communicate, to at least the user 150, via, e.g., the mobile device 140, the PC 216 and/or the television 214, live feed video and/or still images, which may be captured by the camera 324b. In such instances, the captured images, along with other images captured by other cameras associated with other IP LNB assemblies such as the IP LNB assemblies 103b-103c in a region such as the region 170, may be utilized for generating a map for the region 170. The processor 302 may be operable to recognize or identify one or more identifiable objects (e.g., faces, license plates or animals) on the captured images. The IP LNB assembly 300 may then be operable to communicate, to at least the user 150, one or more alarms based on recognition of the one or more identifiable objects. The IP LNB assembly 300 may also be operable to communicate, to at least the user 150, an alarm and/or a notification based on motion information collected from the motion sensor 324c.

Insolation information collected from the insolation sensor 324e along with wind direction information collected from the atmospheric sensor 324a may be utilized to predict available solar energy in a short term. The IP LNB assembly 300 may be operable to communicate, to at least the user 150, an alarm based on seismic information collected from the seismic sensor 324f. The processor 302 may also be operable to determine nearby traffic information and/or ballistic information based on acoustic information collected from the acoustic sensor 324g.

The processor 302 in the IP LNB assembly 300 may be operable to determine whether the associated satellite dish assembly 400 is out of alignment based on directional information collected from the directional sensor 324d such as, for example, the 3D axis compass or the 3D axis gyroscope. In instances when the satellite dish assembly 400 is determined to be out of alignment, the IP LNB assembly 300 may be operable to communicate the determination to a satellite service provider such as the satellite service provider 120 (and/or a corresponding technician) and/or to the user 150. An alignment module such as the alignment module 310 in the IP LNB assembly 300 may be operable to adjust the satellite dish assembly 400, based on directional information collected from the directional sensor 324d. For example, MEMS or piezo electric devices 503 may be employed by the alignment module 310 to electronically adjust field pattern of a feedhorn such as the feedhorn 306 in the IP LNB assembly 300 to provide beam steering. The MEMS or piezo electric devices 503 may also be employed by the alignment module 310 to adjust elements in an antenna array such as the antenna array 316 in the IP LNB assembly 300, for example.

In some embodiments of the invention, the data and/or the services may be provided by the IP LNB assembly 300 based on one or more particular applications 326 which may be installed and running on the IP LNB assembly 300.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for an Internet protocol LNB supporting sensors.

Accordingly, aspects of the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method, comprising:
in an Internet protocol low noise block downconverter (IP LNB) that is within a satellite dish assembly:
collecting information received from one or more sensors which are integrated within or coupled to said IP LNB; and
providing one or more services, to at least a user or a user device associated with said satellite dish assembly, based on said collected information received from said one or more sensors, wherein said one or more services are unrelated to and different than handling of satellite signals received via said satellite dish assembly;
wherein said one or more sensors comprises a camera, an atmospheric sensor, a motion sensor, a directional sensor, an insolation sensor, an acoustic sensor and/or a seismic sensor.

2. The method according to claim 1, comprising storing said collected information locally in said IP LNB and/or remotely in a data center.

3. The method according to claim 1, comprising communicating, to at least the user, one or more alarms based on temporal or spatial changes in said collected information received from said one or more sensors.

4. The method according to claim 1, wherein said one or more sensors perform infrared (IR), cosmic radiation, ultraviolet (UV), far infrared (FIR), terahertz (THz) radiation, millimeter wave (MMW) and/or microwave sensing.

5. The method according to claim 1, wherein weather related information collected from said atmospheric sensor comprises temperature, humidity, precipitation, wind speed, wind direction and/or barometric pressure.

6. The method according to claim 1, comprising generating historical weather data based on weather related information collected from said atmospheric sensor, wherein said historical weather data are utilized to predict weather conditions.

7. The method according to claim 1, comprising communicating, to at least the user, a warning of a possible violent storm and/or a warning of snow build-up, based on weather related information collected from said atmospheric sensor.

8. The method according to claim 1, comprising communicating, to at least the user, live feed video and/or still images which are captured by said camera.

9. The method according to claim 8, wherein said captured images, along with other images captured by other cameras associated with other IP LNBs in a region, are utilized for generating a map for said region.

10. The method according to claim 8, comprising:
recognizing one or more identifiable objects on said captured images; and
communicating, to least the user, one or more alarms based on recognition of said one or more identifiable objects.

11. The method according to claim 1, comprising communicating, to at least the user, an alarm and/or a notification based on motion information collected from said motion sensor.

12. The method according to claim 1, wherein insolation information collected from said insolation sensor along with wind direction information collected from said atmospheric sensor is utilized to predict available solar energy in a short term.

13. The method according to claim 1, comprising communicating, to at least the user, an alarm based on seismic information collected from said seismic sensor.

14. The method according to claim 1, comprising determining nearby traffic information and/or ballistic information based on acoustic information collected from said acoustic sensor.

15. The method according to claim 1, comprising:
determining whether said satellite dish assembly is out of alignment based on directional information collected from said directional sensor; and
when said satellite dish assembly is determined to be out of alignment, communicating said determination to a satellite service provider and/or at least the user.

16. The method according to claim 1, comprising adjusting said satellite dish assembly, via an alignment module in said IP LNB, based on directional information collected from said directional sensor.

17. The method according to claim 1, comprising providing said data and/or said services based on one or more particular applications which are installed and running on said IP LNB.

18. A system, comprising:
an Internet protocol low noise block downconverter (IP LNB) that is operational within a satellite dish assembly, wherein said IP LNB is operable to:
collect information received from one or more sensors which are integrated within or coupled to said IP LNB; and
provide one or more services, to at least a user or a user device associated with said satellite dish assembly, based on said collected information received from said one or more sensors, wherein said one or more services are unrelated to and different than handling of satellite signals received via said satellite dish assembly;
wherein said one or more sensors comprises a camera, an atmospheric sensor, a motion sensor, a directional sensor, an insolation sensor, an acoustic sensor and/or a seismic sensor.

19. The system according to claim 18, wherein said IP LNB is operable to store said collected information locally in said IP LNB and/or remotely in a data center.

20. The system according to claim 18, wherein said IP LNB is operable to communicate, to at least the user, one or more alarms based on temporal or spatial changes in said collected information received from said one or more sensors.

21. The system according to claim 18, wherein said one or more sensors perform infrared (IR), cosmic radiation, ultraviolet (UV), far infrared (FIR), terahertz (THz) radiation, millimeter wave (MMW) and/or microwave sensing.

22. The system according to claim 18, wherein weather related information collected from said atmospheric sensor comprises temperature, humidity, precipitation, wind speed, wind direction and/or barometric pressure.

23. The system according to claim 18, wherein said IP LNB is operable to generate historical weather data based on weather related information collected from said atmospheric sensor, wherein said historical weather data are utilized to predict weather conditions.

24. The system according to claim 18, wherein said IP LNB is operable to communicate, to at least the user, a warning of a possible violent storm and/or a warning of snow build-up, based on weather related information collected from said atmospheric sensor.

25. The system according to claim 18, wherein said IP LNB is operable to communicate, to at least the user, live feed video and/or still images which are captured by said camera.

26. The system according to claim 25, wherein said captured images, along with other images captured by other cameras associated with other IP LNBs in a region, are utilized for generating a map for said region.

27. The system according to claim 25, wherein said IP LNB is operable to:
recognize one or more identifiable objects on said captured images; and
communicate, to least the user, one or more alarms based on recognition of said one or more identifiable objects.

28. The system according to claim 18, wherein said IP LNB is operable to communicate, to at least the user, an alarm and/or a notification based on motion information collected from said motion sensor.

29. The system according to claim 18, wherein insolation information collected from said insolation sensor along with wind direction information collected from said atmospheric sensor is utilized to predict available solar energy in a short term.

30. The system according to claim 18, wherein said IP LNB is operable to communicate, to at least the user, an alarm based on seismic information collected from said seismic sensor.

31. The system according to claim 18, wherein said IP LNB is operable to determine nearby traffic information and/or ballistic information based on acoustic information collected from said acoustic sensor.

32. The system according to claim 18, wherein said IP LNB is operable to:

determine whether said satellite dish assembly is out of alignment based on directional information collected from said directional sensor; and when said satellite dish assembly is determined to be out of alignment, communicate said determination to a satellite service provider and/or at least the user.

33. The system according to claim 18, wherein said IP LNB is operable to adjust said satellite dish assembly, via an alignment module in said IP LNB, based on directional information collected from said directional sensor.

34. The system according to claim 18, wherein said IP LNB is operable to provide said data and/or said services based on one or more particular applications which are installed and running on said IP LNB.

35. A method, comprising:
in an Internet protocol low noise block downconverter (IP LNB) that is within a satellite dish assembly:
  collecting information received from one or more sensors which are integrated within or coupled to said IP LNB;
  providing one or more services, to at least a user or a user device associated with said satellite dish assembly, based on said collected information received from said one or more sensors, wherein said one or more services are unrelated to and different than handling of satellite signals received via said satellite dish assembly; and
  storing said collected information locally in said IP LNB and/or remotely in a data center.

36. A method, comprising:
in an Internet protocol low noise block downconverter (IP LNB) that is within a satellite dish assembly:
  collecting information received from one or more sensors which are integrated within or coupled to said IP LNB;
  providing one or more services, to at least a user or a user device associated with said satellite dish assembly, based on said collected information received from said one or more sensors, wherein said one or more services are unrelated to and different than handling of satellite signals received via said satellite dish assembly; and
  communicating, to at least the user, one or more alarms based on temporal or spatial changes in said collected information received from said one or more sensors.

37. A method, comprising:
in an Internet protocol low noise block downconverter (IP LNB) that is within a satellite dish assembly:
  collecting information received from one or more sensors which are integrated within or coupled to said IP LNB; and
  providing one or more services, to at least a user or a user device associated with said satellite dish assembly, based on said collected information received from said one or more sensors, wherein said one or more services are unrelated to and different than handling of satellite signals received via said satellite dish assembly;
  wherein said one or more sensors perform infrared (IR), cosmic radiation, ultraviolet (UV), far infrared (FIR), terahertz (THz) radiation, millimeter wave (MMW) and/or microwave sensing.

38. A method, comprising:
in an Internet protocol low noise block downconverter (IP LNB) that is within a satellite dish assembly:
  collecting information received from one or more sensors which are integrated within or coupled to said IP LNB;
  providing one or more services, to at least a user or a user device associated with said satellite dish assembly, based on said collected information received from said one or more sensors, wherein said one or more services are unrelated to and different than handling of satellite signals received via said satellite dish assembly; and
  providing said data and/or said services based on one or more particular applications which are installed and running on said IP LNB.

* * * * *